United States Patent Office 3,606,491
Patented Sept. 20, 1971

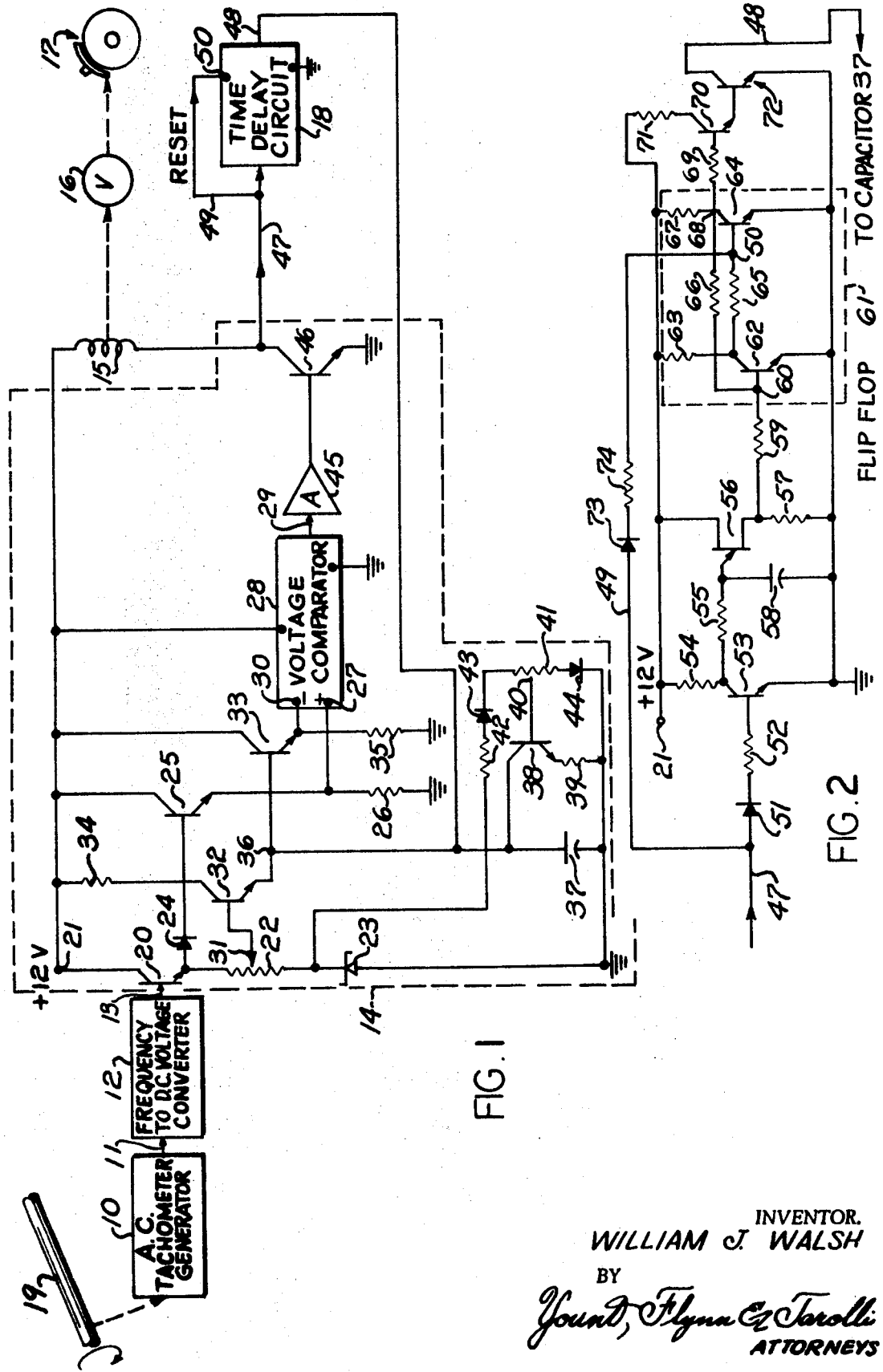

3,606,491
ANTI-WHEEL LOCK BRAKE CONTROL FOR
AUTOMOTIVE VEHICLE
William J. Walsh, Birmingham, Mich., assignor to Eaton
Yale & Towne Inc., Cleveland, Ohio
Filed Feb. 24, 1969, Ser. No. 801,556
Int. Cl. B60t 8/08, 17/22
U.S. Cl. 303—21AF                                13 Claims

ABSTRACT OF THE DISCLOSURE

Anti-wheel lock control for the braking system of an automotive vehicle to avoid skidding by releasing the rear brakes if the rotational wheel velocity becomes significantly less than the apparent ground velocity of the vehicle. The anti-wheel lock control is temporarily disabled by a time delay circuit if the rear brakes are not re-applied automatically within a time interval sufficient for the wheel lock-up condition to be relieved. This time delay circuit monitors the performance of the anti-wheel lock control and also corrects the errors in the apparent vehicle velocity caused by travel downhill or uphill.

This invention relates to a control for the braking system of an automotive vehicle, particularly a passenger car, which will automatically release the brakes if a wheel slows down appreciably faster than the vehicle slows down during braking, such as by skidding on a slippery pavement.

A principal object of this invention is to provide a novel and improved control of this general type which operates in response to the detection of an abrupt reduction in the rotational velocity of a vehicle wheel during braking.

Another object of this invention is to provide such a control which operates in response to a comparison between the instantaneous rotational velocity of a wheel on the vehicle and the apparent ground velocity of the vehicle either to completely release the brake (during a braking skid) or (during non-skid braking) to permit the brake to be applied to the extent established by the driver's operation of the brake pedal.

Another object of this invention is to provide a novel and improved anti-wheel lock control for a vehicle braking system which has a fail-safe monitoring arrangement for the control that insures that the brakes will be re-applied in case the control malfunctions.

Another object of this invention is to provide a novel and improved anti-wheel lock control for a vehicle braking system which has provision for correcting an error in the control's response due to downhill or uphill travel of the vehicle.

Another object of this invention is to provide a novel and improved anti-wheel lock control for a vehicle braking system which has provision for correcting an error in the control's response due to rear wheel spin which may occur under certain driving conditions just before the brakes are applied.

Further objects and advantages of this invention will be apparent from the following detailed description of a presently-preferred embodiment thereof, which is illustrated schematically in the accompanying drawing.

In the drawing:

FIG. 1 is a schematic diagram of the complete anti-wheel lock control according to a preferred embodiment of this invention; and FIG. 2 is an electrical circuit diagram showing in detail a preferred embodiment of the time delay circuit designated by the block 18 in FIG. 1.

Referring to FIG. 1, in broad outline the preferred embodiment of the present system comprises:

An A.C. tachometer-generator 10 for sensing the instantaneous rotational speed of a vehicle wheel and for generating an A.C. output signal on line 11 whose frequency is proportional to the wheel speed;

A converter 12 which receives the A.C. signal on line 11 and converts it to a D.C. signal on line 13 whose magnitude is proportional to the frequency of the A.C. signal (and, therefore, proportional to the rotational wheel speed);

A computer, designated generally by the dashed-line enclosure 14, for providing a comparison between the wheel speed signal and a signal which represents the apparent ground speed of the vehicle;

A solenoid coil 15 controlled by the output signal from the computer 14, a brake valve 16 controlled by solenoid 15, and a vehicle wheel brake 17 controlled by valve 16;

And a time delay circuit 18 which, after a predetermined time delay, temporarily disables the present anti-lock control to permit the brakes to be re-applied if the anti-lock circuit has not already done so automatically during the time delay interval.

The tachometer-generator 10 preferably is driven from the drive shaft 19 of the vehicle, so that the mechanical rotational input to the tachometer-generator is proportional to the instantaneous rotational speed of the rear wheels on the vehicle. Alternatively, if desired, the tachometer-generator 10 may be driven from a rear wheel of the vehicle.

The converter 12 is shown only schematically because a variety of circuit arrangements for producing a D.C. output signal whose amplitude is proportional to the frequency of an A.C. input signal are known, and any suitable circuit for this general purpose may be used in the present system.

As already indicated, the signal on line 13 is a D.C. signal whose amplitude is proportional to the instantaneous rotational speed of a vehicle wheel. In the computer 14, this D.C. wheel velocity signal is applied to the base of an NPN transistor 20 connected for emitter follower operation. The collector of transistor 20 is connected directly to a +12 volt D.C. power supply terminal 21. The emitter of transistor 20 is connected to the upper end of a potentiometer 22 whose lower end is connected through a Zener diode 23 to ground. This Zener diode, when it breaks down for reverse current conduction, provides a 5.1 volt voltage drop to ground.

The emitter of transistor 20 also is connected through a diode 24 to the base of a transistor 25 whose collector is connected directly to the positive power supply terminal 21 and whose emitter is connected through a resistor 26 to ground. The emitter of transistor 25 also is connected directly to the positive input terminal 27 of a voltage comparator 28. The voltage comparator 28 may be a General Electric Company model "PA 238" or any other suitable voltage comparator capable of comparing the respective magnitudes of two D.C. input signals and producing either a zero output signal or a positive output signal of a predetermined magnitude on its output line 29, depending upon which input signal is the greater. It will be apparent that the input signal at terminal 27 of the voltage comparator is proportional to 100% of the instantaneous wheel velocity signal on line 13.

The voltage comparator 28 has a negative input terminal 30 which is connected to the adjustable tap 31 on potentiometer 22 through a series-connected pair of NPN transistors 32 and 33. The potentiometer tap 31 is connected directly to the base of transistor 32. The collector of transistor 32 is connected through a resistor 34 to the positive power supply terminal 21. The emitter of transistor 32 is connected directly to the base of transistor 33. The collector of transistor 33 is connected directly to the positive power supply terminal 21. The emitter of transistor 33 is connected directly to the input terminal 30 of voltage comparator 28, and is connected to ground through a resistor 35.

The juncture 36 between the emitter of transistor 32 and the base of transistor 33 is connected directly to the upper terminal of a storage or memory capacitor 37, which has its lower terminal grounded.

The upper terminal of capacitor 37 is connected through the collector-emitter path of an NPN transistor 38 and a resistor 39 to ground. The base of transistor 38 is connected to an adjustable tap 40 on a potentiometer resistance 41. The upper end of potentiometer resistance 41 is connected to the cathode of the Zener diode 23 through a resistor 42 and a rectifier diode 43. The lower end of potentiometer 41 is connected through a rectifier diode 44 to ground. The potentiometer 40, 41 is mechanically coupled to an accelerometer on the vehicle such that the position of the adjustable tap 40 along the potentiometer resistance 41 is proportional to the apparent linear deceleration of the vehicle with respect to the ground.

With this arrangement the rate at which any positive charge on the upper terminal of capacitor 37 can discharge to ground is proportional to the apparent vehicle deceleration—i.e., the greater the deceleration, the faster the discharge rate of capacitor 37. Therefore, the instantaneous voltage on the upper terminal of capacitor 37 is proportional to the apparent vehicle velocity.

The terms "apparent vehicle deceleration" and "apparent vehicle velocity" are used because if the accelerometer is a conventional suspended-mass type of instrument, its response will accurately represent the actual vehicle deceleration only if the vehicle is traveling on level ground. If the vehicle is going uphill or downhill the response of the accelerometer will include a spurious or error component due to the inclination of the vehicle with respect to the horizontal and therefore the accelerometer response will not be precisely proportional to the actual rate of deceleration of the vehicle. The present system has provision for correcting for this error, as explained in detail hereinafter.

In one practical embodiment of the present system the adjustable tap 31 on potentiometer 22 is set so that the D.C. voltage at the second input terminal 30 of the voltage comparator normally is 85% of the voltage applied to the first input terminal 27 of the voltage comparator. This condition prevails in the absence of any braking of the vehicle.

Also, during braking, the voltage at terminal 27 will be higher than the voltage at terminal 30 as long as the wheel velocity is at least 85% of the apparent vehicle velocity. As long as this condition prevails, the braking is assumed to be "normal."

However, if during braking the vehicle wheel locks up, as in the case of a skid, the instantaneous rotational velocity of the wheel will drop abruptly, immediately decreasing the wheel velocity input signal at terminal 27. At the same time, the input signal at terminal 30 will be dependent upon the apparent ground velocity of the vehicle, as determined by the instantaneous voltage across capacitor 37 which is discharging through transistor 38 at a rate proportional to the apparent vehicle deceleration as sensed by the accelerometer. The emitter-base path of transistor 32 constitutes a blocking diode which prevents capacitor 37 from discharging through the lower part of potentiometer 22 and Zener diode 23 at this time. Under these circumstances, after a very short time interval following the beginning of the wheel lock-up condition, the voltage at the input terminal 30 of voltage comparator 28 will be higher than the voltage at its input terminal 27.

The voltage comparator 28 produces no output signal on its output line 29 as long as its input terminal 27 is positive with respect to its input terminal 30.

However, when the input voltage at terminal 30 exceeds the input voltage at terminal 27, the voltage comparator produces a negative going D.C. output signal of a predetermined amplitude on line 29. After amplification by an amplifier 45, this output signal from the voltage comparator is applied to the base of an NPN transistor 46, turning the latter on for current conduction through its collector-emitter path. Consequently, current flows from the positive power supply terminal 21 through the solenoid coil 15 and the collector-emitter path of transistor 46 to ground. Such energization of coil 15 actuates the brake valve 16 to release the brake 17 automatically, even through the driver of the vehicle may still be holding the brake pedal depressed.

The release of the brake 17 should relieve the locked-up condition of the vehicle wheel, so that now the 100% wheel velocity signal applied to the input terminal 27 of the voltage comparator 28 will soon become greater than the signal at terminal 30, which is proportional to 85% of the apparent vehicle velocity. When this happens, assuming that the driver is still holding the brake pedal depressed, the output signal on line 29 will drop to zero, transistor 46 will become non-conductive, coil 15 will be de-energized and the brake 17 will be re-applied automatically. The brake will remain engaged as long as the driver continues to hold the brake pedal depressed and a wheel lock-up condition of the type already described does not recur.

An important aspect of the present invention relates to the following novel arrangement for disabling the just-described anti-lock control if the brake is not automatically re-applied within a predetermined time interval following its release by the anti-lock control.

As broadly outlined in FIG. 1, this disabling arrangement includes a time delay circuit 18 which receives an input signal on line 47 when the valve solenoid 15 is energized. This input signal is a negative-going pulse caused by the voltage at the lower end of coil 15 dropping from about +12 volts to substantially zero when coil 15 becomes conductive. After a predetermined time interval following the input pulse on line 47, if line 47 has not received a reset pulse during this time interval, the timing circuit will close a switch device to connect the upper terminal of capacitor 37 to ground via line 48, as explained in detail hereinafter with reference to FIG. 2. The reset pulse, if it occurs, is a positive-going pulse which is caused by the turn off of transistor 46, at which time the lower end of coil 15 will again become positive with respect to ground. The reset pulse appears on line 47 and is applied via a line 49 to a reset terminal 50 of the time delay circuit 18, as explained in detail hereinafter with reference to FIG. 2. From the previous description, it will be recalled that when transistor 46 is turned off the brake 17 is automatically re-applied. Therefore, it will be understood that if the brake is automatically re-applied during the critical time interval the reset pulse will occur at substantially the same time as the re-application of the brake, and this reset pulse will prevent the time delay circuit 18 from abruptly discharging capacitor 37 to ground via line 48. However, if the brake is not automatically re-applied and the reset pulse does not occur within this time interval, the time delay circuit 18 will cause the capacitor 37 to be discharged abruptly to ground at the end of the interval.

FIG. 2 shows a preferred embodiment of the time delay circuit 18 of FIG. 1.

The input line 47 is connected through a series-connected blocking diode 51 and resistor 52 to the base of an NPN transistor 53, which has its collector connected through a resistor 54 to the positive power supply terminal 21 and its emitter grounded. The collector of transistor 53 is connected through a resistor 55 to the emitter of a unijunction 56, whose upper base electrode in FIG. 2 is connected directly to the positive power supply terminal 21 and whose lower base electrode is connected through a resistor 57 to ground. A capacitor 58 is connected between the emitter of unijunction 56 and ground.

The lower base electrode of unijunction 56 is connected through a resistor 59 to the input terminal 60 of a flip-flop, which is enclosed by the dashed-line box in FIG. 2 and is designated in its entirety by reference numeral 61. The flip-flop 61 includes a first grounded-emitter NPN transistor 62, which has its base connected directly to the input terminal 60 and its collector connected to the positive power supply terminal 21 through a resistor 63. The flip-flop also has a second grounded-emitter NPN transistor 64. A resistor 65 is connected between the collector of transistor 62 and the base of transistor 64, which is where the aforementioned reset terminal 50 of the time delay circuit is located. The collector of transistor 64 is connected to the flip-flop input terminal 60 through a resistor 66 and to the positive power supply terminal 21 through a resistor 67.

The flip-flop 61 has an output terminal 68 connected directly to the collector of transistor 64. Terminal 68 is connected through a resistor 69 to the base of an NPN transistor 70. The collector of transistor 70 is connected through a resistor 71 to the positive power supply terminal 21. The emitter of transistor 70 is connected directly to the base of a grounded-emitter transistor 72, which is the switch device in the time delay circuit for connecting capacitor 37 to ground via line 48. The collector of transistor 72 is connected by line 48 to the upper terminal of the memory capacitor 37 in the computer 14 shown in FIG. 1. Connected in the reset line 49 and ahead of the reset terminal 50 of the time delay circuit 18 is a blocking diode 73 and a resistor 74 in series.

In one practical embodiment, the various components of the time delay circuit have the following specifications:

Transistors 53, 62, 64, 70—type 2N3903
Transistor 72—type 2N4400
Unijunction 56—type 2N4853
Capacitor 58—2 microfarads, 15 volts
Diodes 51 and 73—IN4154

Resistors:

52—5.6K ohms
54—1K ohm
55—120K ohms
57—47 ohms
59—3.9K ohms
63—1K ohm
65—12K ohms
66—12K ohms
67—1K ohm
69—15K ohms
71—680 ohms
74—12K ohms In the operation of this time delay circuit, during normal (non-skid) braking operation the following conditions prevail:

The output transistor 46 of the computer 14 is non-conductive. Consequently, line 47 is at substantially +12 volts. This positive signal on line 47 is applied to the base of transistor 53, causing the latter to be conductive, so that substantially a 12 volt drop occurs across resistor 54. The upper terminal of capacitor 58 assumes substantially ground potential and the unijunction 56 is non-conductive. In the flip-flop 61, transistor 62 is non-conductive and transistor 64 is conductive. The positive signal on line 47 is applied to the reset terminal 50 to assure that transistor 64 is conductive and transistor 62 is non-conductive. With transistor 64 conductive, the output terminal 68 of the flip-flop is just slightly above ground potential, so that transistor 70 is non-conductive. In turn, transistor 72 is non-conductive and it provides virtually an open-circuit between line 48 and ground, so that the memory capacitor 37 in the computer 14 cannot discharge to ground via line 48 and the switch provided by transistor 72.

When a wheel lock-up condition during braking is sensed, as already described in detail, the output transistor 46 of the computer 14 conducts, causing a negative-going pulse to appear on line 47 because the potential at the lower end of coil 15 drops from about +12 volts down to zero. This negative-going pulse is not applied directly to the reset terminal 50 of the time delay circuit because of the blocking action of diode 73. However, the negative-going pulse on line 47 turns off the input transistor 53 of the time delay circuit. Consequently, a charging current flows from the positive power supply terminal 21 through resistors 54 and 55 to the upper terminal of capacitor 58 and, after a predetermined charging interval, the unijunction 56 turns on to discharge the capacitor 58 through the emitter-lower base path of the unijunction and resistor 57 to ground. When the unijunction 56 is turned on, a positive signal appears at the flip-flop input terminal 60, turning on transistor 62 and turning off transistor 64. Because of the turn-off of transistor 64, transistor 70 is turned on and, in turn, transistor 72 is turned on. Such turn-on of transistor 72 switches the upper terminal of capacitor 37 abruptly to ground.

The total time delay between the negative-going pulse on line 47 and the turn-on of transistor 72 may, by appropriate choice of the components of the time delay circuit, be made any desired value. The optimum value now appears to be about 0.7 second because test results have indicated that this is the longest time it would take, in the case of a passenger car driven at 80 miles per hour on an icy road and having its brake system equipped with the present anti-wheel lock control, for the wheels to lock up when the brakes are applied and then to come back up to the vehicle speed because of the automatic release of the brakes, as described.

If no positive-going reset pulse appears at line 47 within the critical interval (e.g., 0.7 second), capacitor 37 will be discharged abruptly to ground by the turn-on of transistor 72. This abruptly reduces to zero the apparent vehicle velocity signal applied to terminal 30 of the voltage comparator 28. Consequently, the wheel velocity signal at terminal 27 will cause the voltage comparator to produce a substantially zero output signal on line 29, transistor 46 will be turned off and coil 15 will be de-energized to cause the brake to be re-applied automatically.

However, if the coil 15 is de-energized within the critical time interval (e.g., 0.7 second) following the negative-going pulse on line 47 by the action of the anti-lock control, then a positive-going pulse will appear on line 47 and will be applied to the reset terminal 50, turning on transistor 64 and turning off transistor 62. This positive-going pulse will also turn on transistor 53, causing the unijunction 56 to be turned off. The turn-off of transistor 64 causes transistors 70 and 72 to be turned off, and transistor 72 now prevents the memory capacitor 37 in computer 14 from discharging to ground through line 48.

Thus, the time delay circuit 18 can only disable the anti-lock control temporarily (by discharging capacitor 37 abruptly) in the event that the brakes are not re-applied automatically within the critical time interval after the anti-lock circuit has responded to a wheel lock-up condition.

This operation of the time delay circuit is advantageous in several respects:

(1) It provides a redundant safety circuit which monitors the operation of the anti-lock computer 14 in a fail-safe manner, since it will cause the brakes to be re-applied at the end of a time interval during which they should have been re-applied by the operation of computer 14.

(2) In a situation where the driver has accelerated the vehicle after coming to a stop and the rear wheels begin to spin on a slippery pavement and the driver then applies the brakes, because of the wheel spin the actual vehicle velocity will be very small. However, because the wheel rotational velocity input signal at line 13 was high, a relatively high charge will have been stored in the memory capacitor 37. If the application of the brake causes the rear wheels to lock up, the computer 14 will respond as if a skid condition were occurring at a vehicle speed much greater than the actual vehicle speed. The computer, therefore, will release the brakes automatically, but after the time interval provided by the delay circuit 18, the spurious charge on capacitor 37 will be discharged abruptly to ground, causing the rear brakes to be re-applied, which resets the time delay circuit 18 as described.

(3) If the vehicle is braked while going downhill, the conventional suspended-mass accelerometer will show a spurious deceleration component due to the inclination of the vehicle during braking. This accelerometer error introduces an error into the response of the computer 14, which responds as if the vehicle were slowing down faster than it actually is. Consequently, the apparent vehicle velocity signal at the voltage comparator input terminal 30 will be less than it should be.

If the brakes are applied and the wheels lock up going downhill, the computer 14 will respond as already described to release the brakes and to apply a negative-going pulse on line 47. After 0.7 second, the time delay circuit 18 will cause the charge on the memory capacitor 37 in computer 14 to be discharged abruptly to ground. This charge was erroneous (lower than it should have been) to the extent that the accelerometer's response was in error due to the downhill travel of the vehicle during braking. The discharge of capacitor 37 will cause the brakes to be re-applied, and now the capacitor 37 will be charged (via the potentiometer tap 31) to a value which is proportional to the rotational wheel velocity, which now is representative of the ground velocity of the vehicle because the wheel lock-up condition has been relieved.

If the wheel lock-up or skid condition recurs repeatedly while the driver continues to hold the brake pedal depressed, the time delay circuit 18 will repeatedly disable the anti-lock control temporarily and will repeatedly restore the charge on the memory capacitor 37 to a value which more correctly represents the actual ground velocity of the vehicle. Thus, the present system permits the accelerometer error to occur during downhill braking, but it corrects this error after a brief time interval in a fail-safe manner in that it tends to keep the brakes on.

(4) If the vehicle is braked whilegoing uphill, the response of the conventional suspended-mass accelerometer will introduce an error by tending to delay more than it should the discharge of capacitor 37, thereby causing the apparent vehicle velocity signal at the voltage comparator input terminal 30 to be higher than it should be. In the worst case, the response of the computer 14 would indicate that the vehicle is not slowing down at all when in fact it is slowing down. The vehicle wheel can develop 15% slip before the voltage comparator 28 will cause the brake to be released. This produces a negative-going pulse on line 47 and, after a 0.7 second interval, the time delay circuit will cause the memory capacitor 37 to be discharged abruptly to ground, causing the brake to be re-applied, at which time a positive-going reset pulse will be applied to the rest terminal 50 of the time delay circuit. This permits the memory capacitor 37 in the computer to receive a new charge (via the potentiometer tap 31) which is proportional to the rotational wheel velocity and, therefore, since the wheel is no longer skidding, is proportional to the actual vehicle ground speed.

From the foregoing description it will be apparent that the preferred embodiment of the present control provides one of two possible conditions for the brake-controlling solenoid coil 15—either full energization or de-energization. This is because the voltage comparator 28 has only two possible output conditions and in this respect it may be regarded as having a binary, rather than an analog, output characteristic. This is preferable because the mechanical inertia of the braking system makes it better adapted for control by a system having a binary electrical output than by a system having an analog electrical output.

Also, the present control arrangement is particularly advantageous by virtue of the arrangement of the time delay circuit 18, as described, to temporarily disable the anti-lock operation of the control in case the brakes are not re-applied within the predetermined time interval.

While a presently preferred embodiment of the present control has been described in detail with reference to the accompanying drawing, it is to be understood that various modifications, omissions and adaptations which depart from the disclosed embodiment may be adopted without departing from the spirit and scope of the present invention.

Having described my invention, I claim:

1. An anti-wheel lock control for a vehicle braking system comprising memory storage means for storing a signal representative of a function of the vehicle movement during braking, means for producing a signal representative of a function of the rotational wheel movement during braking, means for comparing said vehicle movement signal against said wheel movement signal, means for releasing the brake when said wheel movement signal differs significantly from the vehicle movement signal, and means operable after a time interval following the release of the brake for abruptly removing the vehicle movement signal from said memory storage means to thereby permit the brake to be re-applied.

2. A control according to claim 1, wherein said vehicle movement signal is proportional to the ground velocity of the vehicle, said wheel movement signal is proportional to the rotational wheel velocity, and said means for releasing the brake releases the brake when the wheel velocity signal drops below a predetermined percentage of the vehicle velocity signal.

3. A control according to claim 2, wherein said memory storage means comprises a capacitor, and further comprising means for discharging said capacitor in accordance with the deceleration of the vehicle during braking so that the voltage across the capacitor is substantially proportional to the vehicle velocity, and wherein said means for abruptly removing the vehicle velocity signal from said memory storage means comprises normally-open switch means connected to said capacitor and means for closing said switch means to discharge said capacitor at the end of said time interval.

4. A control according to claim 2, wherein said means for releasing the brake includes an electrically-operable control element coupled to the output of said means for comparing the vehicle velocity and wheel velocity signals, said comparing means provides a binary output for causing said control element to be either energized or not energized, and said means for removing the vehicle velocity signal from said memory storage means comprises a time delay circuit operatively connected between said control element and said memory storage means to receive a first input signal in response to a change in the energization of said control element to one binary state and operable after a predetermined time interval following said first input signal to remove the vehicle velocity signal from said memory storage means.

5. A control according to claim 4, wherein said time delay circuit has provision for preventing the removal of the vehicle velocity signal from said memory storage means upon the reception during said time interval of a second input signal in response to a reversal of the energization of said control element to the opposite binary state.

6. A control according to claim 5, wherein said time delay circuit has a normally-open semiconductor switch connected to said memory storage means, and means for closing said switch after said predetermined time interval following said first input signal and for preventing the closing of said switch if said second input signal is received during said time interval.

7. A control according to claim 6, wherein said last-mentioned means comprises a flip-flop operable to one binary state after said predetermined time interval following said first input signal and operable to the opposite binary state substantially immediately upon the reception of said second input signal.

8. A control according to claim 7, wherein said time delay circuit comprises and R-C time delay circuit connected between said control element and said flip-flop to provide said predetermined time interval between said first input signal and the operation of said flip-flop to close said semiconductor switch.

9. A control according to claim 8, and further comprising means for applying said second input signal directly to said flip-flop and bypassing said R-C time delay circuit.

10. A vehicle braking system comprising:
   (A) wheel brake means for application by the operator;
   (B) means operative during application of said brake means to sense a predetermined braking condition and release said brake means in response to sensing of said condition;
   (C) means operative upon the passage of a predetermined period of time after said release to disable said releasing means and allow reapplication of said brake means; and
   (D) means operative in response to said disabling to recondition said releasing means and said disabling means to allow said releasing means to again release said brake means if said predetermined braking condition is still being sensed and allow said disabling means to thereafter again disable said releasing means after the passage of said predetermined period of time.

11. A vehicle braking system comprising:
   (A) wheel brake means for application by the vehicle operator;
   (B) means operative to sense vehicle ground velocity and rotational wheel velocity and generate a skid signal in response to reduction of wheel velocity substantially below vehicle ground velocity;
   (C) means operative during application of said brake means to release said brake means in response to generation of said skid signal;
   (D) means operative upon the passage of a predetermined period of time after said release to remove said skid signal if said signal is still being generated and disable said releasing means to allow reapplication of said brake means by said operator; and
   (E) means operative in response to said disabling to recondition said generating means and said disabling means to allow said releasing means to again release said brake means if said skid signal is still in effect and allow said disabling means to thereafter again remove said skid signal and disable said releasing means after the passage of said predetermined period of time.

12. An anti-wheel lock control for a vehicle having at least one brake, said control comprising:
   (A) means for producing a signal representative of the rotational wheel movement;
   (B) means for producing a signal representative of the vehicle movement;
   (C) comparing means for comparing said wheel movement signal to said vehicle movement signal and operative to produce an output signal when said vehicle movement signal is greater than said wheel movement signal;
   (D) means operable by said output of said comparing means to release said brake when said output signal is produced; and
   (E) time delay means operative upon the passage of a predetermined period of time after said brake releasing action to remove said vehicle movement signal from said comparing means and thereby remove said output signal and disable said releasing means to allow reapplication of said brake.

13. An anti-wheel lock control system for a vehicle having a wheel brake of the fluid type controlled by a brake valve, said system comprising:
   (A) an AC generator operative to generate an AC output signal having a frequency proportional to the rotational speed of the braked wheel;
   (B) a frequency to DC voltage converter receiving said AC output signal and operative to convert said signal to a DC voltage signal having a magnitude proportional to the frequency of said AC signal and therefore proportional to the rotational wheel speed;
   (C) means for sensing the vehicle ground speed and operative to generate a velocity signal representative of the vehicle ground speed;
   (D) a comparator receiving said DC voltage signal and said ground speed signal and operative to generate an output signal which is a comparison between said DC voltage and said ground speed signals;
   (E) a solenoid coil operative in response to receipt of said output signal from said comparator to actuate said brake valve in a sense to release said wheel brake; and
   (F) a time delay circuit operative upon the passage of a predetermined period of time after said brake releasing action to remove said ground speed signal from said comparator.

References Cited

UNITED STATES PATENTS

| 3,275,384 | 9/1966 | Hirzel | 303—21 |
| 3,362,757 | 1/1968 | Marcheron | 303—21 |
| 3,398,995 | 8/1968 | Martin | 303—21 |
| 3,017,145 | 1/1962 | Yarber | 303—21UX |
| 3,260,555 | 7/1966 | Packer | 303—21 |
| 3,482,887 | 12/1969 | Sheppard | 303—21 |
| 3,498,682 | 3/1970 | Mueller et al. | 303—21 |

MILTON BUCHLER, Primary Examiner

J. J. McLAUGHLIN, Assistant Examiner

U.S. Cl. X.R.

188—181C